US012062218B2

(12) United States Patent
Miyakawa (10) Patent No.: US 12,062,218 B2
(45) Date of Patent: Aug. 13, 2024

(54) IMAGE PROCESSING METHOD, IMAGE PROCESSING DEVICE, AND MEDIUM WHICH SYNTHESIZE MULTIPLE IMAGES (71) Applicant: NIPPON TELEGRAPH AND TELEPHONE CORPORATION, Tokyo (JP)

(72) Inventor: Kazu Miyakawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 417 days.

(21) Appl. No.: 17/595,562

(22) PCT Filed: May 22, 2019

(86) PCT No.: PCT/JP2019/020330
§ 371 (c)(1),
(2) Date: Nov. 19, 2021

(87) PCT Pub. No.: WO2020/235063
PCT Pub. Date: Nov. 26, 2020

(65) Prior Publication Data
US 2022/0262094 A1 Aug. 18, 2022

(51) Int. Cl.
G06V 10/44 (2022.01)
G06T 3/4038 (2024.01)
G06V 20/17 (2022.01)
(52) U.S. Cl.
CPC ............ G06V 10/44 (2022.01); G06T 3/4038 (2013.01); G06V 20/17 (2022.01)

(58) Field of Classification Search
None
See application file for complete search history.

(56) References Cited

U.S. PATENT DOCUMENTS

2014/0340427 A1* 11/2014 Baker ................. G06T 5/50
345/641
2020/0098135 A1* 3/2020 Ganjineh ............ G06F 16/587

OTHER PUBLICATIONS

Zia et al. "360° Panorama Generation using Drone Mounted Fisheye Cameras", 2019 IEEE International Conference on Consumer Electronics (ICCE) (Year: 2019).*

(Continued)

Primary Examiner — Randolph I Chu
(74) Attorney, Agent, or Firm — XSENSUS LLP (57) ABSTRACT An image processing method includes: acquiring first and second frame images shot by cameras; acquiring first state information of an unmanned aerial vehicle and second and third state information of the cameras; extracting feature point groups from the first and second frame images; calculating correction values based on the state information at the first time and state information at a second time; outputting the extracted feature point groups as corrected feature point groups at the first at a predetermined timing, and correcting feature point groups at the second time as the corrected feature point groups at the first time at a timing other than the predetermined timing; calculating a transformation parameter using the corrected feature point groups; performing projective transformation of the first and second frame images based on the transformation parameter; and synthesizing the first and second frame images after the projective transformation.

13 Claims, 5 Drawing Sheets (56) References Cited

OTHER PUBLICATIONS

Wierzbicki, "Multi-Camera Imaging System for UAV Photogrammetry", Sensors 2018, 18, 2433; doi:10.3390/s18082433 (Year: 2018).*
Perazzi et al. "Panoramic Video from Unstructured Camera Arrays", EUROGRAPHICS 2015, vol. 34 (2015), No. 2 (Year: 2015).*
Choi et al. "Real-time panorama video system using networked multiple cameras", Journal of Systems Architecture 64 (2016) 110-121 (Year: 2016).*
www.ntt.co.jp, Retrieved on Apr. 4, 2019, from URL: http://www.ntt.co.jp/svlab/activity/pickup/qa53.html.

* cited by examiner

IMAGE PROCESSING METHOD, IMAGE PROCESSING DEVICE, AND MEDIUM WHICH SYNTHESIZE MULTIPLE IMAGES

TECHNICAL FIELD

The present invention relates to an image processing method, an image processing device, and a program for synthesizing frame images shot by cameras mounted on an unmanned aerial vehicle.

BACKGROUND ART

A live distribution using a small-sized camera represented by an action camera has been actively performed with a reduction in size of equipment, an improvement in accuracy, and an increase in battery capacity, for example. In the small-sized camera, a super-wide-angle lens having a horizontal viewing angle of 120° or more has been used in many cases. When the super-wide-angle lens is used, a wide-range video image with realistic sensation (a high realistic panoramic video image) can be shot. On the other hand, wide-range information is made to fall within one lens using the super-wide-angle lens. Accordingly, a large amount of information is lost due to peripheral distortion of the lens so that an image quality of an image deteriorates. For example, the image becomes rougher in its periphery.

It is difficult to shoot a high realistic panoramic video image by one camera, as described above. A technique for combining video images shot by a plurality of highly precise cameras with one another to make it appear as if a landscape was shot by one camera has been developed (see Non-Patent Literature 1).

In the technique described in Non-Patent Literature 1, each of the cameras makes a predetermined range narrower than a wide-angle lens fall within the lens. A panoramic video image obtained by synthesizing video images shot by the cameras is a more highly precise panoramic video image throughout than when the wide-angle lens is used.

Figure 1:
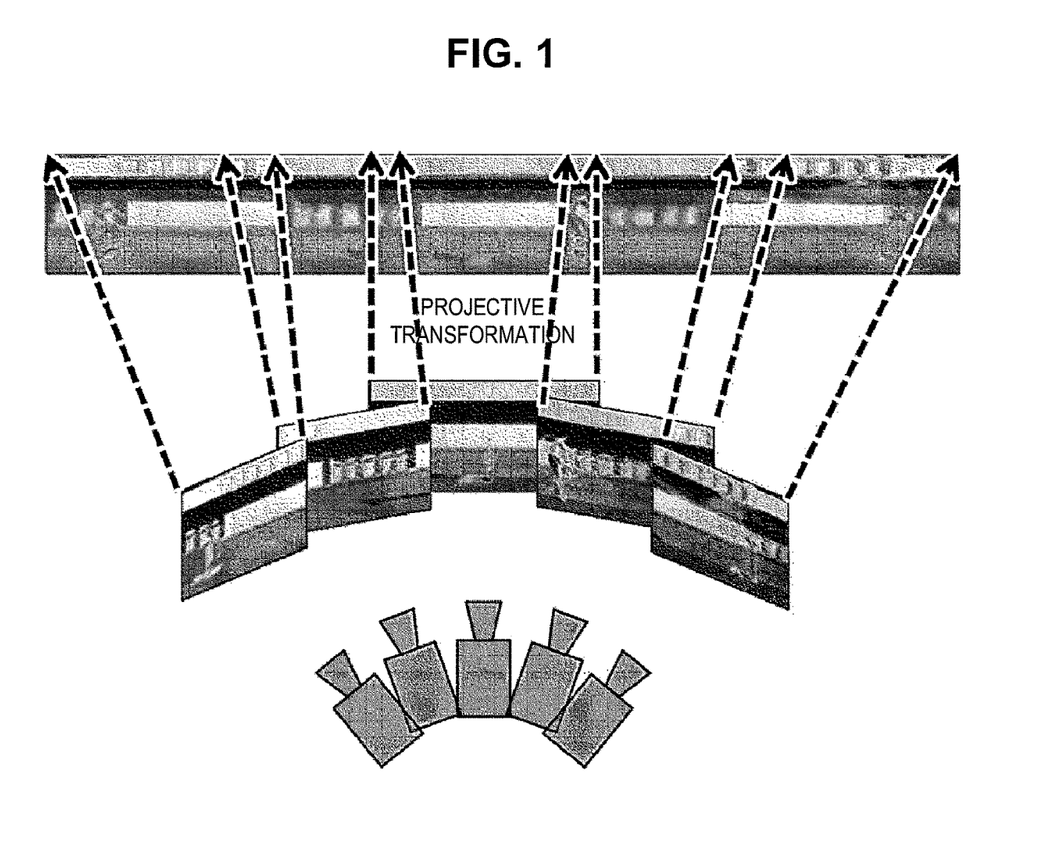
FIG. 1 is a diagram for describing synthesis of frame images by projective transformation.

In such panoramic video image synthesis, the plurality of cameras perform shooting in different directions with a certain point as its center. When the video images shot by the cameras are synthesized as a panoramic video image, projective transformation (nomography) using a correspondence of feature points among frame images. The projective transformation is transformation for transforming a square (plane) into another square (plane) with straightness of a side of the square maintained. When a plurality of correspondences from a feature point to a feature point are used, a transformation parameter for performing projective transformation is estimated. When projective transformation is performed using the transformation parameter, distortion due to a direction of the camera in a frame image group is removed, and the frame image group can be projected onto one plane as if it was shot by one lens so that synthesis with no unnatural feeling can be performed (see FIG. 1).

On the other hand, when the transformation parameter is not correctly estimated due to an error in the correspondence of the feature points, a deviation occurs between frame images shot by the cameras, an unnatural line occurs in a combination portion, and a conflict occurs in the image. Accordingly, shooting of respective panoramic video images by the plurality of cameras is generally performed with a camera group grounded and firmly fixed.

The projective transformation is transformation from a plane to a plane. Accordingly, if a flat panel on which a plurality of markers (feature point detection targets) are drawn is installed at a position where respective shooting ranges of the plurality of cameras overlap one another, highly accurate synthesis can be performed on a plane formed by the flat panel. Hereinafter, the flat panel on which the plurality of markers are drawn is referred to as a marker panel. If a camera group is fixed to perform shooting, derivation (calibration) of the transformation parameter using the marker panel may be generally performed once.

CITATION LIST

Non-Patent Literature

Non-Patent Literature 1: "Ultra-wide video image synthesis technique", [online], [searched on May 15, 2019], Internet <URL:http://www.ntt.co.jp/svlab/activity/pickup/qa53.html>

SUMMARY OF THE INVENTION

Technical Problem

In recent years, a small-sized unmanned aerial vehicle (UAV) having a weight of approximately several kilograms has been widely used. For example, shooting by a small-sized camera or the like mounted on the unmanned aerial vehicle has been generally performed. The unmanned aerial vehicle has a feature of being able to easily perform shooting in various locations because it is small in size.

The shooting by the unmanned aerial vehicle is desirably performed to shoot a wide-range video image as highly accurately as possible because it has also been expected to be used for public use such as rapid information collection in a disaster area. Accordingly, a technique for shooting highly precise panoramic video images using a plurality of cameras as described in Non-Patent Literature 1 has been desired.

When the unmanned aerial vehicle is provided with the plurality of cameras to synthesize the panoramic video images, feature points for finding a correspondence between frame images move on the image from hour to hour because the unmanned aerial vehicle moves. In the case, some of the feature points disappear out of the images, and new feature points are added. Accordingly, a correspondence of the feature points is newly found for each frame. A marker panel interferes with shooting. Thus, calibration permanently provided with the marker panel cannot be performed. Accordingly, video image synthesis is performed using natural feature points appearing on the images. However, the natural feature points do not necessarily exist on the same plane. Thus, an accuracy of synthesis of video images decreases. A method of tracking the feature points on the image to match movement of a position is also considered. However, the feature points may disappear out of the images, and the tracking may be erroneously performed by the feature points newly added, which makes it difficult to ensure the accuracy of synthesis of the video images.

An object of the present invention made in view of the above-described problem is to provide an image processing method, an image processing device, and a program that enable an accuracy of synthesis of frame images shot by cameras mounted on an unmanned aerial vehicle to be improved.

Means for Solving the Problem

To solve the above-described problem, an image processing method according to the present invention is an image processing method for synthesizing frame images shot by a plurality of cameras mounted on an unmanned aerial vehicle, the image processing method including an image acquisition step of acquiring a first frame image shot by a first camera and a second frame image shot by a second camera at a first time, an information acquisition step of acquiring first state information representing a state of the unmanned aerial vehicle, second state information representing a state of the first camera, and third state information representing a state of the second camera at the first time, an extraction step of extracting feature point groups for performing projective transformation from the acquired first frame image and second frame image, a calculation step of calculating correction values for correcting the feature point groups based on the first state information, the second state information, and the third state information at the first time and the first state information, the second state information, and the third state information at a second time before the first time, a correction step of outputting the extracted feature point groups as corrected feature point groups at the first time at a predetermined timing, and correcting corrected feature point groups at the second time using the correction values and outputting the corrected feature point groups at the second time as the corrected feature point groups at the first time at a timing other than the predetermined timing, a transformation parameter calculation step of calculating a transformation parameter for performing the projective transformation using the corrected feature point groups, a transformation step of performing projective transformation of the first frame image and the second frame image based on the calculated transformation parameter, and a synthesis step of synthesizing the first frame image and the second frame image after the projective transformation.

To solve the above-described problem, an image processing device according to the present invention is an image processing device that synthesizes frame images shot by a plurality of cameras mounted on an unmanned aerial vehicle, the image processing device including a first acquisition unit that acquires a first frame image shot by a first camera and a second frame image shot by a second camera at a first time, a second acquisition unit that acquires first state information representing a state of the unmanned aerial vehicle, second state information representing a state of the first camera, and third state information representing a state of the second camera at the first time, a feature point extraction unit that extracts feature point groups for performing projective transformation from the first frame image and the second frame image each acquired by the first acquisition unit, a feature point correction value calculation unit that calculates correction values for correcting the feature point groups based on the first state information, the second state information, and the third state information at the first time, each acquired by the second acquisition unit, and the first state information, the second state information, and the third state information at a second time before the first time, a feature point correction unit that outputs the extracted feature point groups as corrected feature point groups at the first time at a predetermined timing, and corrects corrected feature point groups at the second time using the correction values and outputs the corrected feature point groups at the second time as the corrected feature point groups at the first time at a timing other than the predetermined timing, a transformation parameter calculation unit that calculates a transformation parameter for performing the projective transformation using the corrected feature point groups, a frame image transformation unit that performs projective transformation of the first frame image and the second frame image based on the transformation parameter calculated by the transformation parameter calculation unit, and a frame image synthesis unit that synthesizes the first frame image and the second frame image after the projective transformation.

To solve the above-described problem, a program according to the present invention causes a computer to function as the above-described image processing device.

Effects of the Invention

An image processing method, an image processing device, and a program according to the present invention enable an accuracy of synthesis of frame images shot by cameras mounted on an unmanned aerial vehicle to be improved.

DESCRIPTION OF EMBODIMENTS

An aspect for implementing the present invention will be described below with reference to the drawings.

Figure 2:
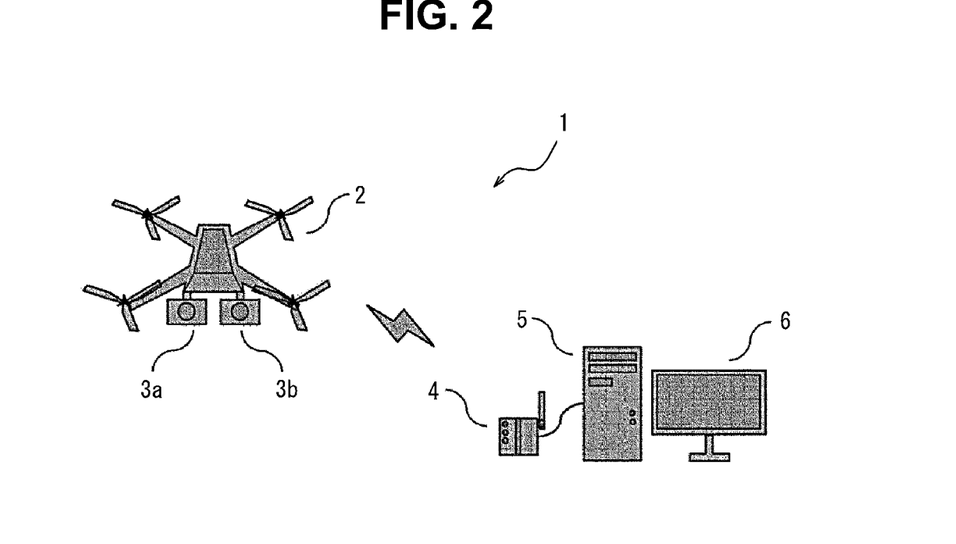
FIG. 2 is a diagram illustrating a configuration example of a panoramic video image synthesis system including an image processing device according to an embodiment of the present invention.

FIG. 2 is a diagram illustrating a configuration example of a panoramic video image synthesis system 1 including a computer 5 as an image processing device according to an embodiment of the present invention.

The panoramic video image synthesis system 1 illustrated in FIG. 2 includes an unmanned aerial vehicle 2, a plurality of cameras 3 (two cameras 3a and 3b in FIG. 2), a wireless reception device 4, a computer 5, and a display device 6. The panoramic video image synthesis system 1 according to the present embodiment synthesizes frame images shot by the cameras 3a and 3b mounted on the unmanned aerial vehicle 2, to generate a high realistic panoramic video image.

The unmanned aerial vehicle 2 is a small-sized unmanned aerial vehicle having a weight of approximately several kilograms, and is provided with the cameras 3a and 3b.

The cameras 3a and 3b perform shooting in different directions. Video image data of video images shot by the cameras 3a and 3b are wirelessly transmitted to the wireless reception device 4 from the unmanned aerial vehicle 2. Although description is made using an example in which the unmanned aerial vehicle 2 is provided with the two cameras 3a and 3b in the present embodiment, the unmanned aerial vehicle 2 may be provided with three or more cameras 3.

The wireless reception device 4 receives the video image data of the video images shot by the cameras 3a and 3b, which have been wirelessly transmitted from the unmanned aerial vehicle 2, in real time, and outputs the received video image data to the computer 5.

The computer 5 synthesizes the video images shot by the cameras 3a and 3b, which are represented by the video image data received by the wireless reception device 4, to generate a high realistic panoramic video image.

The display device 6 displays the high realistic panoramic video image generated by the computer 5.

Then, respective configurations of the unmanned aerial vehicle 2, the computer 5, and the display device 6 will be described with reference to FIG. 3. The wireless reception device 4 is a general wireless communication device having a function of receiving a signal wirelessly transmitted, and hence description thereof is omitted in FIG. 3.

First, the configuration of the unmanned aerial vehicle 2 will be described.

Figure 3:
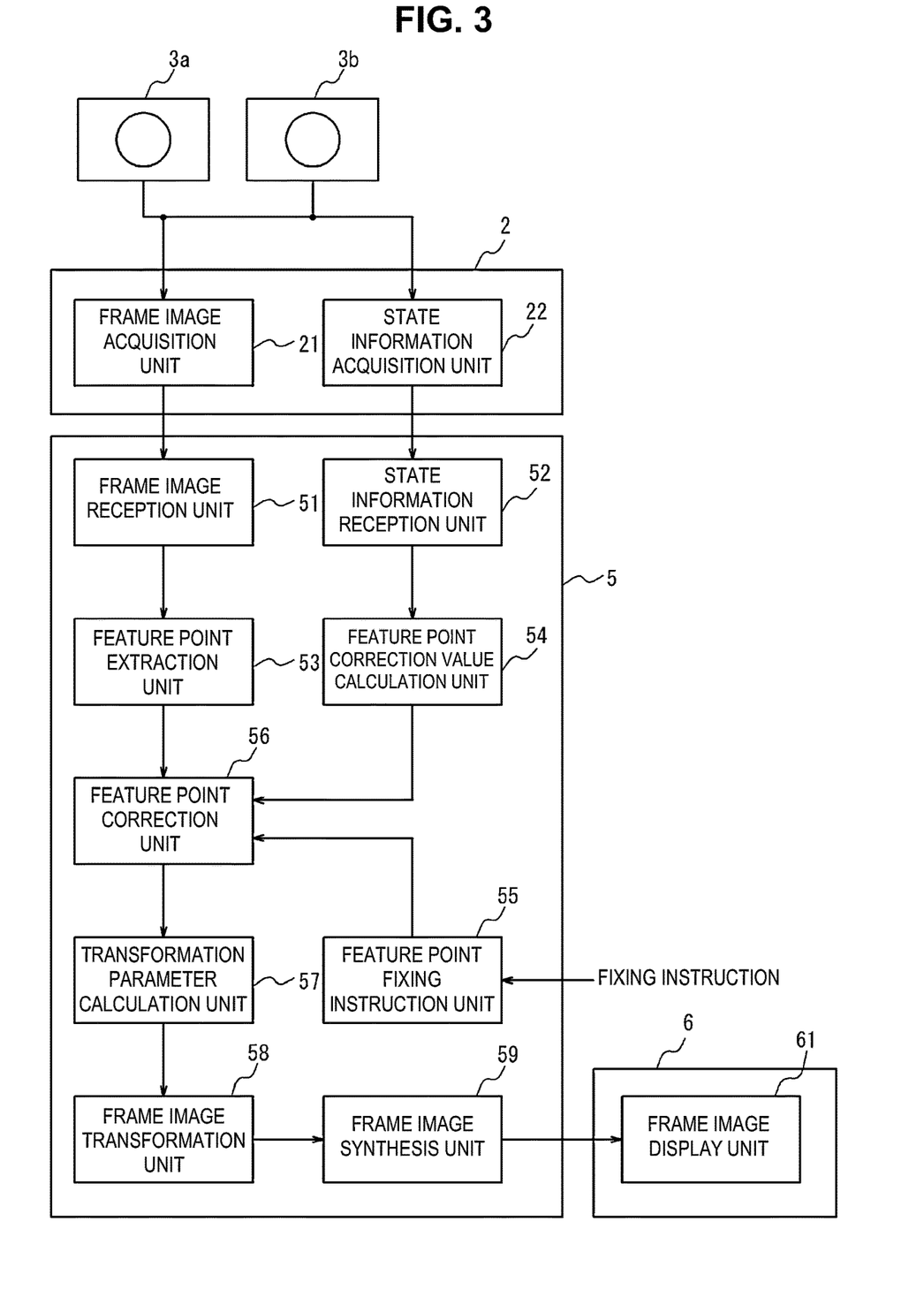
FIG. 3 is a diagram illustrating a configuration example of an unmanned aerial vehicle, a computer, and a display device illustrated in FIG. 2.

As illustrated in FIG. 3, the unmanned aerial vehicle 2 includes a frame image acquisition unit 21 and a state information acquisition unit 22. In FIG. 3, only components particularly related to the present invention among components in the unmanned aerial vehicle 2 are illustrated, and description of components for causing the unmanned aerial vehicle 2 to fly and performing wireless transmission is omitted.

The frame image acquisition unit 21 acquires frame images $f_t^{3a}$ and $f_t^{3b}$ respectively shot by the cameras 3a and 3b at a time t, and wirelessly transmits the acquired frame images to the wireless reception device 4 (not illustrated).

The state information acquisition unit 22 acquires state information $S_t^v$ of the unmanned aerial vehicle 2 at the time t. The state information acquisition unit 22 acquires position information of the unmanned aerial vehicle 2 based on a GPS (global positioning system) signal, for example, as the state information $S_t^v$. The state information acquisition unit 22 acquires information, which can be acquired by various types of sensors provided in the unmanned aerial vehicle 2, such as altitude information as the state information $S_t^v$.

The state information acquisition unit 22 acquires state information $S_t^{3a}$ of the camera 3a and state information $S_t^{3b}$ of the camera 3b at the time t. The state information acquisition unit 22 acquires information, which can be acquired by various types of sensors provided in the cameras 3a and 3b or respective fixation instruments of the cameras 3a and 3b, such as directions and zoom values of the cameras 3a and 3b.

The state information acquisition unit 22 wirelessly transmits the acquired state information $S_t^v$, $S_t^{3a}$, and $S_t^{3b}$ to the wireless reception device 4.

Then, the configuration of the computer 5 will be described.

As illustrated in FIG. 3, the computer 5 includes a frame image reception unit 51, a state information reception unit 52, a feature point extraction unit 53, a feature point correction value calculation unit 54, a feature point fixing instruction unit 55, a feature point correction unit 56, a transformation parameter calculation unit 57, a frame image transformation unit 58, and a frame image synthesis unit 59. The frame image reception unit 51 is an example of a first acquisition unit. The state information reception unit 52 is an example of a second acquisition unit. Respective functions of the frame image reception unit 51, the state information reception unit 52, the feature point extraction unit 53, the feature point correction value calculation unit 54, the feature point fixing instruction unit 55, the feature point correction unit 56, the transformation parameter calculation unit 57, the frame image transformation unit 58, and the frame image synthesis unit 59 can be implemented by executing a program stored in a memory included in the computer 5 using a processor or the like. Although the "memory" is a semiconductor memory, a magnetic memory, or an optical memory, for example, in the present embodiment, the present invention is not limited to this. Although the "processor" is a general-purpose processor, a processor specialized to specific processing, or the like in the present embodiment, the present embodiment is not limited to these.

The frame image reception unit 51 receives (acquires) the frame images $f_t^{3a}$ and $f_t^{3b}$ transmitted from the unmanned aerial vehicle 2 via the wireless reception device 4. That is, the frame image reception unit 51 acquires the frame image $f_t^{3a}$ (first frame image) shot by the camera 3a (first camera) and the frame image $f_t^{3b}$ (second frame image) shot by the camera 3b (second camera) at the time t (first time). The frame image reception unit 51 may acquire the frame images $f_t^{3a}$ and $f_t^{3b}$ from the unmanned aerial vehicle 2 without via wireless communication but via a cable, for example. In this case, the wireless reception device 4 is not required. The frame image reception unit 51 outputs the received frame images $f_t^{3a}$ and $f_t^{3b}$ to the feature point extraction unit 53.

The state information reception unit 52 receives (acquires) the state information $S_t^v$, $S_t^{3a}$, and $S_t^{3b}$ transmitted from the unmanned aerial vehicle 2 via the wireless reception device 4. That is, the state information reception unit 52 acquires the state information $S_t^v$ (first state information) representing a state of the unmanned aerial vehicle 2, the state information $S_t^{3a}$ (second state information) representing a state of the camera 3a, and state information $S_t^{3b}$ (third state information) representing a state of the camera 3b at the time t. The state information reception unit 52 may acquire the state information $S_t^v$, $S_t^{3a}$, and $S_t^{3b}$ from the unmanned aerial vehicle 2 without via wireless communication but via a cable, for example. In this case, the wireless reception device 4 is not required. The state information reception unit 52 outputs the received state information $S_t^v$, $S_t^{3a}$, and $S_t^{3b}$ to the feature point correction value calculation unit 54.

The feature point extraction unit 53 extracts, from the frame images $f_t^{3a}$ and $f_t^{3b}$ output from the frame image reception unit 51, feature point groups for performing projective transformation for projecting one of the frame images onto the other frame image. Specifically, the feature point extraction unit 53 extracts feature points required to perform projective transformation and a correspondence of the feature points between the frame image $f_t^{3a}$ and the frame image $f_t^{3b}$. As a result, the feature point extraction unit 53 extracts a set of a plurality of feature points a correspondence of which is obtained between the frame images $f_t^{3a}$ and $f_t^{3b}$ and respective positions of the plurality of feature points (a feature point group $V_t^{3a}$ extracted from the frame image $f_t^{3a}$ and a feature point group $V_t^{3b}$ extracted from the frame image $f_t^{3b}$).

The feature point extraction unit 53 extracts the feature point groups using a predetermined feature point extraction algorithm and a predetermined feature point correspondence algorithm (matching algorithm) for finding the correspondence of the feature points. Examples of the algorithm can include algorithms such as FAST (feature from accelerated segment test), ORB (oriented FAST and rotated BRIEF (binary robust independent elementary features)), SIFT (scale-invariant feature transform), and SURF (speeded up robust features).

The feature point extraction unit 53 outputs the extracted feature point groups $V_t^{3a}$ and $V_t^{3b}$ to the feature point correction unit 56.

The feature point correction value calculation unit 54 calculates correction values $C_t^{3a}$ and $C_t^{3b}$ for respectively correcting the feature point groups $V_t^{3a}$ and $V_t^{3b}$ based on the state information $S_t^v$, $S_t^{3a}$, and $S_t^{3b}$ at the time t and state information $S_{t-1}^v$, $S_{t-1}^{3a}$, and $S_{t-1}^{3b}$ at a time t−1 (second time) before the time t. The correction values $C_t^{3a}$ and $C_t^{3b}$ are values for respectively finding to which positions feature point groups $V_{t-1}^{3a}$ and $V_{t-1}^{3b}$ at the time t−1 move at the time t. The correction values $C_t^{3a}$ and $C_t^{3b}$ can be easily calculated using affine transformation based on a movement amount of the unmanned aerial vehicle 2, respective posture changes of the cameras 3a and 3b, and the like. The feature point correction value calculation unit 54 outputs the calculated correction values $C_t^{3a}$ and $C_t^{3b}$ to the feature point correction unit 56.

The feature point fixing instruction unit 55 accepts an input of an instruction to fix feature points from a system user of the panoramic video image synthesis system 1. The feature point fixing instruction unit 55 outputs, when it accepts the input of the fixing instruction, an input time t' when the fixing instruction has been input to the feature point correction unit 56.

The feature point correction unit 56 corrects the feature point groups $V_t^{3a}$ and $V_t^{3b}$ at the time t based on the correction values $C_t^{3a}$ and $C_t^{3b}$ output from the feature point correction value calculation unit 54, and outputs the corrected feature point groups at the time t to the transformation parameter calculation unit 57 as corrected feature point groups $V_t^{3a'}$ and $V_t^{3b'}$. The corrected feature point groups $V_t^{3a'}$ and $V_t^{3b'}$ represent movement destinations at the time t of the feature point groups $V_{t-1}^{3a}$ and $V_{t-1}^{3b}$ at the time t−1 to be found based on respective behaviors of the unmanned aerial vehicle 2 and the cameras 3a and 3b.

Specifically, the feature point correction unit 56 outputs the feature point groups $V_t^{3a}$ and $V_t^{3b}$ to the transformation parameter calculation unit 57 as the corrected feature point groups $V_t^{3a'}$ and $V_t^{3b'}$ at the time t at the input time t' output from the feature point fixing instruction unit 55. That is, the feature point correction unit 56 outputs feature point groups $V_t^{3a}$ and $V_t^{3b}$, respectively, as the corrected feature point groups $V_t^{3a'}$ and $V_t^{3b'}$ as they are. The feature point correction unit 56 outputs feature point groups at the time t−1 (corrected feature point groups $V_{t-1}^{3a'}$ and $V_{t-1}^{3b'}$) at a time other than the input time t' output from the feature point fixing instruction unit 55 based on the following expression (1) using the correction values $C_t^{3a}$ and $C_t^{3b}$, and outputs the corrected feature point groups at the time t−1 as the corrected feature point groups $V_t^{3a'}$ and $V_t^{3b'}$ at the time t. The corrected feature point groups $V_t^{3a'}$ and $V_t^{3b'}$ are immobile in an absolute coordinate system including the unmanned aerial vehicle 2, although moving on a screen.

$$V_t' = C_t V_{t-1}'$$ Expression (1)

Thus, the feature point correction unit 56 outputs the extracted feature point groups $V_t^{3a}$ and $V_t^{3b}$ as the corrected feature point groups $V_t^{3a'}$ and $V_t^{3b'}$ at the time t at a predetermined timing (a timing at which the feature point fixing instruction unit 55 has accepted the fixing instruction). The feature point correction unit 56 corrects the feature point groups at the time t−1 (the corrected feature point groups $V_{t-1}^{3a'}$ and $V_{t-1}^{3b'}$) using the correction values $C_t^{3a}$ and $C_t^{3b}$ at a timing other than the predetermined timing (other than the timing at which the feature point fixing instruction unit 55 has accepted the fixing instruction), and outputs the feature point groups at the time t−1 as the corrected feature point groups $V_t^{3a'}$ and $V_t^{3b'}$ at the time t.

Thus, the system user (user) sets respective marker panels in shooting ranges of the cameras 3a and 3b, and can use feature points on the marker panel and feature points on the marker panel as the corrected feature point groups Vt3a' and Vt3b' at a timing at which the fixing instruction has been input to the feature point fixing instruction unit 55. Therefore, at the time of start of an operation of the panoramic video image synthesis system 1, for example, correct feature point groups can be found by installing the marker panels in the shooting ranges of the cameras 3a and 3b and inputting the fixing instruction to the feature point fixing instruction unit 55.

The feature point correction unit 56 can find the corrected feature point groups $V_t^{3a'}$ and $V_t^{3b'}$ based on the foregoing expression (1), respectively, using the correction values $C_t^{3a}$ and $C_t^{3b}$ at a timing other than the timing at which the fixing instruction has been input to the feature point fixing instruction unit 55. When the corrected feature point groups $V_t^{3a'}$ and $V_t^{3b'}$ are respectively found using the correction values $C_t^{3a}$ and $C_t^{3b}$ calculated based on the state information corresponding to the respective behaviors of the unmanned aerial vehicle 2 and the cameras 3a and 3b with the feature point groups specified at the timing at which the fixing instruction has been input as a reference, accurate feature point groups can be found.

The transformation parameter calculation unit 57 calculates a transformation parameter for performing projective transformation using the corrected feature point groups $V_t^{3a'}$ and $V_t^{3b'}$ output from the feature point correction unit 56. The corrected feature point groups $V_t^{3a'}$ and $V_t^{3b'}$ are immobile in an absolute coordinate system including the unmanned aerial vehicle 2, although moving on an image. Accordingly, the transformation parameter calculation unit 57 can calculate a highly precise transformation parameter by using the corrected feature point groups $V_t^{3a'}$ and $V_t^{3b'}$. The transformation parameter calculation unit 57 outputs the calculated transformation parameter to the frame image transformation unit 58.

The frame image transformation unit 58 performs projective transformation of the frame images $f_t^{3a}$ and $f_t^{3b}$ based on the transformation parameter output from the transformation parameter calculation unit 57. The frame image transformation unit 58 outputs the frame images $f_t^{3a}$ and $f_t^{3b}$ after the projective transformation to the frame image synthesis unit 59.

The frame image synthesis unit 59 synthesizes the frame images $f_t^{3a}$ and $f_t^{3b}$ after the projective transformation (image groups projected onto one plane) output from the frame image transformation unit 58, to generate a high realistic panoramic video image. The frame image synthesis unit 59 outputs the generated high realistic panoramic image to the display device 6.

The display device 6 includes a frame image display unit 61. The frame image display unit 61 displays the high realistic panoramic image output from the frame image synthesis unit 59.

Figure 4:
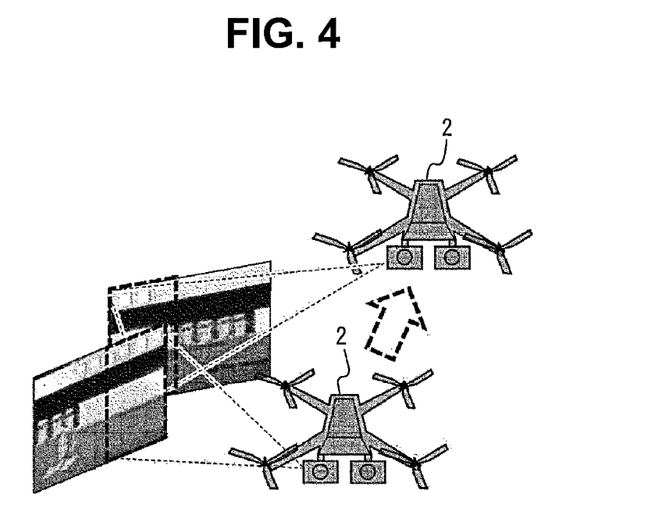
FIG. 4 is a diagram for describing generation of a high realistic panoramic video image corresponding to movement of the unmanned aerial vehicle in the panoramic video image synthesis system illustrated in FIG. 2.

In the panoramic video image synthesis system 1 according to the present embodiment, the system user installs the marker panels in the shooting ranges of the cameras 3a and 3b and inputs the fixing instruction to the feature point fixing instruction unit 55. Thus, respective feature point groups on the marker panels are extracted. When the feature point groups are held as a reference, the corrected feature point groups $V_t^{3a'}$ and $V_t^{3b'}$ are also respectively found using the correction values $C_t^{3a}$ and $C_t^{3b}$ with the held feature point groups as a reference after the marker panels are removed so that highly accurate corrected feature point groups $V_t^{3a'}$ and $V_t^{3b'}$ corresponding to the respective behaviors of the unmanned aerial vehicle 2 and the cameras 3a and 3b can also be obtained when the unmanned aerial vehicle 2 has moved, as illustrated in FIG. 4. Accordingly, a high-quality high realistic panoramic video image can be generated.

When the correction of the feature point groups $V_t^{3a}$ and $V_t^{3b}$ respectively based on the correction values $C_t^{3a}$ and $C_t^{3b}$ is repeated, errors may be accumulated, resulting in a decrease in accuracy. The feature point correction unit 56 may output the extracted feature point groups $V_t^{3a}$ and $V_t^{3b}$, respectively, as the corrected feature point groups $V_t^{3a'}$ and $V_t^{3b'}$ at a previously defined periodic timing and correct the feature point groups $V_{t-1}^{3a}$ and $V_{t-1}^{3b}$ at the time t−1, respectively, using the correction values $C_t^{3a}$ and $C_t^{3b}$ and output the corrected feature point groups at the time t−1 as the corrected feature point groups $V_t^{3a'}$ and $V_t^{3b'}$ at a timing other than the previously defined periodic timing. Thus, accurate feature point groups are periodically found. Accordingly, the accuracy can be prevented from decreasing due to the accumulation of the errors, and a high-quality high realistic panoramic video image can be consecutively generated.

Then, an image processing method to be performed in the computer 5 according to the present embodiment will be described with reference to a flowchart of FIG. 5.

Step S11: The frame image reception unit 51 acquires a frame image $f_t^{3a}$ shot by the camera 3a and a frame image $f_t^{3b}$ shot by the camera 3b at a time (an image acquisition step).

Step S12: The feature point extraction unit 53 extracts feature point groups $V_t^{3a}$ and $V_t^{3b}$, respectively, from the acquired frame images $f_t^{3a}$ and $f_t^{3b}$ (an extraction step).

Step S13: The state information reception unit 52 acquires state information $S_t^v$ of the unmanned aerial vehicle 2 and state information $S_t^{3a}$ and $S_t^{3b}$ of the cameras 3a and 3b at the time t in parallel with processing in steps S11 and S12 (an information acquisition step).

Step S14: The feature point correction value calculation unit 54 calculates correction values $C_t^{3a}$ and $C_t^{3b}$ based on the state information $S_t^v$, $S_t^{3a}$, and $S_t^{3b}$ at the time t and state information $S_{t-1}^v$, $S_{t-1}^{3a}$, and $S_{t-1}^{3b}$ at a time t−1 before the time t (a correction value calculation step).

Figure 5:
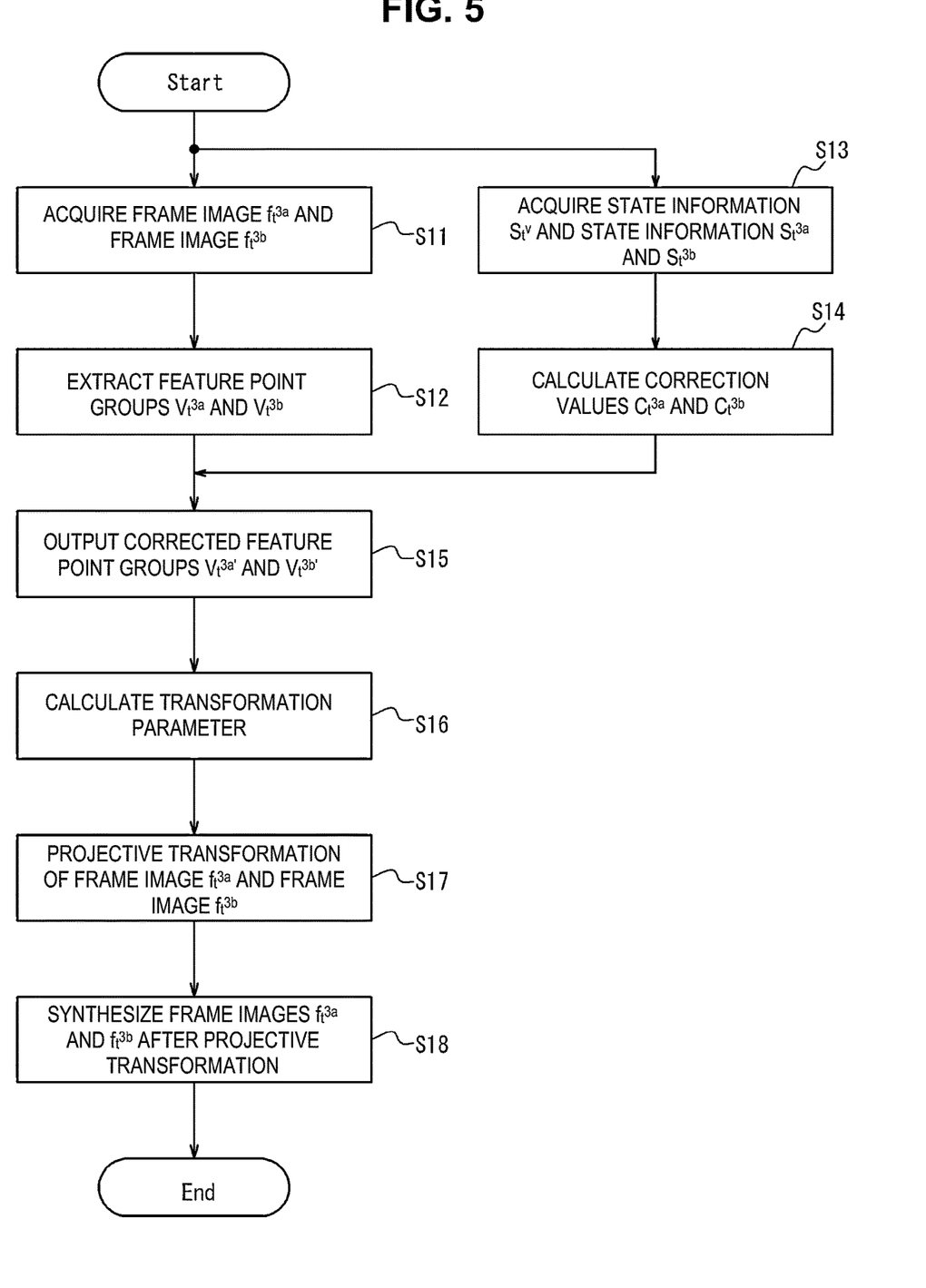
FIG. 5 is a flowchart for describing an image processing method to be performed in the computer illustrated in FIG. 3.

Although an example in which the processing in steps S11 and S12 and processing in steps S13 and S14 are performed in parallel with each other is illustrated in FIG. 5, the present invention is not limited to this. One of the processing in steps S11 and S12 and the processing in steps S13 and S14 may be first performed, and the other processing may be later performed.

Step 15: The feature point correction unit 56 generates corrected feature point groups $V_t^{3a'}$ and $V_t^{3b'}$, respectively, based on the feature point groups $V_t^{3a}$ and $V_t^{3b}$ and the correction values $C_t^{3a}$ and $C_t^{3b}$ and outputs the generated corrected feature point groups (a correction step). Specifically, the feature point correction unit 56 outputs the extracted feature point groups $V_t^{3a}$ and $V_t^{3b}$, respectively, as the corrected feature point groups $V_t^{3a'}$ and $V_t^{3b'}$ at a predetermined timing (a timing at which a fixing instruction has been input to the feature point fixing instruction unit 55). The feature point correction unit 56 corrects feature point groups at the time t−1 (corrected feature point groups $V_{t-1}^{3a'}$ and $V_{t-1}^{3b'}$) using the correction values $C_t^{3a}$ and $C_t^{3b}$ and outputs the corrected feature point groups at the time t−1 as the corrected feature point groups $V_t^{3a'}$ and $V_t^{3b'}$ at a timing other than the predetermined timing (other than the timing at which the fixing instruction has been input to the feature point fixing instruction unit 55).

Step S16: The transformation parameter calculation unit 57 calculates a transformation parameter for performing projective transformation using the corrected feature point groups $V_t^{3a'}$ and $V_t^{3b'}$ (a transformation parameter calculation step).

Step S17: The frame image transformation unit 58 performs projective transformation of the frame images $f_t^{3a}$ and $f_t^{3b}$ based on the calculated transformation parameter (a transformation step).

Step S18: The frame image synthesis unit 59 synthesizes the frame images $f_t^{3a}$ and $f_t^{3b}$ after the projective transformation (a synthesis step).

Thus, the image processing method according to the present embodiment includes the image acquisition step of acquiring the frame images $f_t^{3a}$ and $f_t^{3b}$ respectively shot by the cameras 3a and 3b at the time t, the information acquisition step of acquiring the state information $S_t^v$ of the unmanned aerial vehicle 2 and the respective state information $S_t^{3a}$ and $S_t^{3b}$ of the cameras 3a and 3b at the time t, the extraction step of extracting the feature point groups $V_t^{3a}$ and $V_t^{3b}$, respectively, from the acquired frame images $f_t^{3a}$ and $f_t^{3b}$, the correction value calculation step of calculating the correction values $C_t^{3a}$ and $C_t^{3b}$ based on the state information $S_t^v$, $S_t^{3a}$, and $S_t^{3b}$ at the time t and the state information $S_{t-1}^v$, $S_{t-1}^{3a}$, and $S_{t-1}^{3b}$ at the time t−1 before the time t, the correction step of outputting the extracted feature point groups $V_t^{3a}$ and $V_t^{3b}$, respectively, as the corrected feature point groups $V_t^{3a'}$ and $V_t^{3b'}$ at the time t at the predetermined timing and correcting the feature point groups $V_{t-1}^{3a}$ and $V_{t-1}^{3b}$ at the time t−1, respectively, using the correction values $C_t^{3a}$ and $C_t^{3b}$ and outputting the corrected feature point groups at the time t−1 as the corrected feature point groups $V_t^{3a'}$ and $V_t^{3b'}$ at the time t, the transformation parameter calculation step of calculating the transformation parameter using the corrected feature point groups $V_t^{3a'}$ and $V_t^{3b'}$, the transformation step of performing projective transformation of the frame images $f_t^{3a}$ and $f_t^{3b}$ based on the calculated transformation parameter, and the synthesis step of synthesizing the frame images $f_t^{3a}$ and $f_t^{3b}$ after the projective transformation.

The computer 5 according to the present embodiment includes the frame image reception unit 51 that acquires the frame images $f_t^{3a}$ and $f_t^{3b}$ respectively shot by the cameras 3a and 3b at the time t, the state information reception unit 52 that acquires the state information $S_t^v$ of the unmanned aerial vehicle 2 and the respective state information $S_t^{3a}$ and $S_t^{3b}$ of the cameras 3a and 3b at the time t, the feature point extraction unit 53 that extracts the feature point groups $V_t^{3a}$ and $V_t^{3b}$, respectively, from the frame images $f_t^{3a}$ and $f_t^{3b}$ acquired by the frame image reception unit 51, the feature point correction value calculation unit 54 that calculates the correction values $C_t^{3a}$ and $C_t^{3b}$ based on the state information $S_t^v$, $S_t^{3a}$, and $S_t^{3b}$ at the time t and the state information $S_{t-1}^v$, $S_{t-1}^{3a}$, and $S_{t-1}^{3b}$ at the time t−1 before the time t, the feature point correction unit 56 that outputs the extracted feature point groups $V_t^{3a}$ and $V_t^{3b}$, respectively, as the corrected feature point groups $V_t^{3a'}$ and $V_t^{3b'}$ at the time t at the predetermined timing, and corrects the feature point groups $V_{t-1}^{3a}$ and $V_{t-1}^{3b}$ at the time t−1, respectively, using the correction values $C_t^{3a}$ and $C_t^{3b}$ and outputs the corrected feature point groups at the time t−1 as the corrected feature point groups $V_t^{3a'}$ and $V_t^{3b'}$ at the time t at the timing other than the predetermined timing, the transformation parameter calculation unit 57 that calculates the transformation parameter using the corrected feature point groups $V_t^{3a'}$ and $V_t^{3b'}$, the frame image transformation unit 58 that performs the projective transformation of the frame images $f_t^{3a}$ and $f_t^{3b}$ based on the calculated transformation parameter, and the frame image synthesis unit 59 that synthesizes the frame images $f_t^{3a}$ and $f_t^{3b}$ after the projective transformation.

At the predetermined timing, when the feature point groups $V_t^{3a}$ and $V_t^{3b}$ extracted from the frame image $f_t^{3a}$ and $f_t^{3b}$ are respectively set as the corrected feature point groups $V_t^{3a'}$ and $V_t^{3b'}$, feature points on the marker panel and feature points on the marker panel, each installed at the predetermined timing, can be used as the corrected feature point groups $V_t^{3a'}$ and $V_t^{3b'}$, for example. At the timing other than the predetermined timing, when the corrected feature point groups are corrected using the correction values $C_t^{3a}$ and $C_t^{3b}$ found based on the state information into the corrected feature point groups $V_t^{3a'}$ and $V_t^{3b'}$, the accurate corrected feature point groups $V_t^{3a'}$ and $V_t^{3b'}$ corresponding to the respective behaviors of the unmanned aerial vehicle 2 and the cameras 3a and 3b can be found with the accurate feature points found at the predetermined timing as a reference. Accordingly, a highly accurate transformation parameter can be calculated. As a result, an accuracy of synthesis of the frame images shot by the cameras 3a and 3b mounted on the unmanned aerial vehicle 2 can be improved.

Although description has been made using an example in which processing from the acquisition of the frame image $f_t^{3a}$ and $f_t^{3b}$ and the state information $S_t^v$, $S_t^{3a}$, and $S_t^{3b}$ to the synthesis of the frame images $f_t^{3a}$ and $f_t^{3b}$ is performed in the computer 5 in the present embodiment, the present invention is not limited to this, but the processing may be performed in the unmanned aerial vehicle 2.

The feature point correction unit 56 may compare, when the corrected feature points $V_t^{3a'}$ and $V_t^{3b'}$ respectively exist on the frame images $f_t^{3a}$ and $f_t^{3b}$, the corrected feature points with extraction results of the feature point groups by the feature point extraction unit 53 to further correct positions of the feature points. Thus, even if errors occur in the state information $S_t^v$, $S_t^{3a}$, and $S_t^{3b}$, the respective positions of the feature points can be specified based on the feature points on the frame images $f_t^{3a}$ and $f_t^{3b}$.

A program for performing each processing to be performed by a computer functioning as the computer 5 may be provided, although not particularly mentioned. The program may be recorded on a computer readable medium. If the computer readable medium is used, the program can be installed into the computer. The computer readable medium having the program recorded therein may be a non-transient recording medium. The non-transient recording medium is not particularly limited, but may be a recording medium such as a CD-ROM or a DVD-ROM.

Although the above-described embodiment has been described as a representative example, it should be apparent to those skilled in the art that many changes and replacements are possible within the spirit and scope of the present invention. Therefore, the present invention should not be construed as being limited by the above-described embodiment, but various modifications and changes can be made without departing from the claims. For example, a plurality of constituent blocks described in a configuration diagram of the embodiment can be combined into one, or one constituent block can be divided.

REFERENCE SIGNS LIST

1 Panoramic video image synthesis system
2 Unmanned aerial vehicle
3a, 3b Camera
4 Wireless reception device
5 Computer (image processing device)
6 Display device
21 Frame image acquisition unit
22 State information acquisition unit
51 Frame image reception unit (first acquisition unit)
52 State information reception unit (second acquisition unit)
53 Feature point extraction unit
54 Feature point correction value calculation unit
55 Feature point fixing instruction unit
56 Feature point correction unit
57 Transformation parameter calculation unit
58 Frame image transformation unit
59 Frame image synthesis unit
61 Frame image display unit

The invention claimed is:

1. An image processing method for synthesizing frame images shot by a plurality of cameras mounted on an unmanned aerial vehicle, the image processing method comprising:
   acquiring a first frame image shot by a first camera and a second frame image shot by a second camera at a first time;
   acquiring first state information representing a state of the unmanned aerial vehicle, second state information representing a state of the first camera, and third state information representing a state of the second camera at the first time;
   extracting feature point groups for performing projective transformation from the acquired first frame image and the acquired second frame image;
   calculating correction values for correcting the feature point groups based on the first state information, the second state information, and the third state information at the first time and the first state information, the second state information, and the third state information at a second time before the first time;
   outputting the extracted feature point groups as corrected feature point groups at the first time at a predetermined timing, and correcting corrected feature point groups at the second time using the correction values and outputting the corrected feature point groups at the second time as the corrected feature point groups at the first time at a timing other than the predetermined timing;
   calculating a transformation parameter for performing the projective transformation using the corrected feature point groups;
   performing projective transformation of the first frame image and the second frame image based on the calculated transformation parameter; and
   synthesizing the first frame image and the second frame image after the projective transformation.

2. The image processing method according to claim 1, further comprising:
   accepting an input from a user,
   wherein the outputting the extracted feature point groups includes outputting the extracted feature point groups as corrected feature point groups at a timing at which the input has been accepted, and correcting the feature point groups at the second time using the correction values and outputting the corrected feature point groups at the second time as the corrected feature point groups at the first time at a timing other than the timing at which the input has been accepted.

3. The image processing method according to claim 1, wherein;
   the outputting the extracted feature point groups includes outputting the extracted feature point groups as corrected feature point groups at a previously defined periodic timing, and correcting the feature point groups at the second time using the correction values and outputting the corrected feature point groups at the second time as the corrected feature point groups at the first time at a timing other than the previously defined periodic timing.

4. An image processing device that synthesizes frame images shot by a plurality of cameras mounted on an unmanned aerial vehicle, the image processing device comprising:

first acquisition means for acquiring a first frame image shot by a first camera and a second frame image shot by a second camera at a first time;

second acquisition means for acquiring first state information representing a state of the unmanned aerial vehicle, second state information representing a state of the first camera, and third state information representing a state of the second camera at the first time;

feature point extraction means for extracting feature point groups for performing projective transformation from the first frame image and the second frame image each acquired by the first acquisition means for acquiring;

feature point correction value calculation means for calculating that calculates correction values for correcting the feature point groups based on the first state information, the second state information, and the third state information at the first time, each acquired by the second acquisition means for acquiring, and the first state information, the second state information, and the third state information at a second time before the first time;

feature point correction means for outputting the extracted feature point groups as corrected feature point groups at the first time at a predetermined timing, and corrects corrected feature point groups at the second time using the correction values and outputs the corrected feature point groups at the second time as the corrected feature point groups at the first time at a timing other than the predetermined timing;

transformation parameter calculation means for calculating a transformation parameter for performing the projective transformation using the corrected feature point groups;

frame image transformation means for performing projective transformation of the first frame image and the second frame image based on the transformation parameter calculated by the transformation parameter calculation means; and frame image synthesis means for synthesizing the first frame image and the second frame image after the projective transformation.

5. The image processing device according to claim 4, further comprising:

feature point fixing instruction means for accepting an input from a user, wherein the feature point correction means outputs the extracted feature point groups as corrected feature point groups at a timing at which the feature point fixing instruction means has accepted the input, and corrects the feature point groups at the second time using the correction values and outputs the corrected feature point groups at the second time as the corrected feature point groups at the first time at a timing other than the timing at which the feature point fixing instruction means has accepted the input.

6. The image processing device according to claim 4, wherein:

the feature point correction means outputs the feature point groups extracted by the feature point extraction means as corrected feature point groups at a previously defined periodic timing, and corrects the feature point groups at the second time using the correction values and outputs the corrected feature point groups at the second time as the corrected feature point groups at the first time at a timing other than the previously defined periodic timing.

7. A non-transitory computer readable medium storing a program for causing a computer to function as the image processing device according to claim 4.

8. A non-transitory computer readable medium storing a program for causing a computer to perform the method of claim 1.

9. An image processing system for synthesizing frame images shot by a plurality of cameras, comprising:

a processor; and a memory storing a program which when executed by the processor causes the processor to perform:

acquiring a first frame image shot by a first camera and a second frame image shot by a second camera at a first time;

acquiring first state information representing a state of an unmanned aerial vehicle, second state information representing a state of the first camera, and third state information representing a state of the second camera at the first time;

extracting feature point groups for performing projective transformation from the acquired first frame image and the acquired second frame image;

calculating correction values for correcting the feature point groups based on the first state information, the second state information, and the third state information at the first time and the first state information, the second state information, and the third state information at a second time before the first time;

outputting the extracted feature point groups as corrected feature point groups at the first time at a predetermined timing, and correcting corrected feature point groups at the second time using the correction values and outputting the corrected feature point groups at the second time as the corrected feature point groups at the first time at a timing other than the predetermined timing;

calculating a transformation parameter for performing the projective transformation using the corrected feature point groups;

performing projective transformation of the first frame image and the second frame image based on the calculated transformation parameter; and synthesizing the first frame image and the second frame image after the projective transformation.

10. The image processing system according to claim 9, wherein the program stored in the memory further causes the processor to perform:

accepting an input from a user, wherein the outputting the extracted feature point groups includes outputting the extracted feature point groups as corrected feature point groups at a timing at which the input has been accepted, and correcting the feature point groups at the second time using the correction values and outputting the corrected feature point groups at the second time as the corrected feature point groups at the first time at a timing other than the timing at which the input has been accepted.

11. The image processing system according to claim 9, wherein:

the outputting the extracted feature point groups includes outputting the extracted feature point groups as corrected feature point groups at a previously defined periodic timing, and correcting the feature point groups at the second time using the correction values and outputting the corrected feature point groups at the second time as the corrected feature point groups at the first time at a timing other than the previously defined periodic timing.

12. The image processing system of claim 9, further comprising:

the first camera; and the second camera.

13. The image processing system of claim 12, further comprising:

an unmanned aerial vehicle to which the first and second camera are mounted.

* * * * *